(12) United States Patent
Kueny et al.

(10) Patent No.: US 11,867,641 B2
(45) Date of Patent: Jan. 9, 2024

(54) IMAGE PROCESSING TECHNIQUES FOR MULTI-SENSOR INSPECTION OF PIPE INTERIORS

(71) Applicant: RedZone Robotics, Inc., Warrendale, PA (US)

(72) Inventors: Todd Kueny, Tarentum, PA (US); Justin Starr, Baden, PA (US); Foster J. Salotti, Verona, PA (US)

(73) Assignee: RedZone Robotics, Inc., Warrendale, PA (US)

( * ) Notice: Subject to any disclaimer, the term of this patent is extended or adjusted under 35 U.S.C. 154(b) by 139 days.

(21) Appl. No.: 17/307,041

(22) Filed: May 4, 2021

(65) Prior Publication Data

US 2021/0255116 A1   Aug. 19, 2021

Related U.S. Application Data

(63) Continuation of application No. 16/353,034, filed on Mar. 14, 2019, now Pat. No. 11,029,257.

(60) Provisional application No. 62/643,482, filed on Mar. 15, 2018.

(51) Int. Cl.
  *G01N 21/954*   (2006.01)
  *G01N 21/88*   (2006.01)
  *G01S 17/89*   (2020.01)

(52) U.S. Cl.
  CPC ....... *G01N 21/954* (2013.01); *G01N 21/8851* (2013.01); *G01N 2021/8887* (2013.01); *G01N 2021/9544* (2013.01); *G01N 2021/9548* (2013.01); *G01S 17/89* (2013.01)

(58) Field of Classification Search
  CPC ............ G01N 21/954; G01N 21/8851; G01N 2021/8887; G01N 2021/9544; G01N 2021/9548; G01S 17/89
  USPC ......................... 356/241, 613–624, 432–442
  See application file for complete search history.

(56) References Cited

U.S. PATENT DOCUMENTS

| | | | | |
|---|---|---|---|---|
| 9,176,052 B2* | 11/2015 | Tunheim | ............... | G01N 21/954 |
| 9,651,503 B2* | 5/2017 | Bueno | .................. | G01N 21/954 |
| 9,784,599 B1* | 10/2017 | Close | ...................... | F16L 55/30 |
| 2003/0023404 A1* | 1/2003 | Moselhi | ............... | G01N 21/954 |
| | | | | 702/181 |
| 2006/0290779 A1* | 12/2006 | Reverte | ..................... | E03F 7/10 |
| | | | | 348/84 |
| 2008/0021662 A1* | 1/2008 | Hinn | ....................... | G01M 3/38 |
| | | | | 702/33 |
| 2010/0218624 A1* | 9/2010 | Atwood | ................. | B62D 55/12 |
| | | | | 180/9.1 |

(Continued)

*Primary Examiner* — Isiaka O Akanbi
(74) *Attorney, Agent, or Firm* — Gabriel & Co; Andrew M. Gabriel (57) ABSTRACT

An embodiment provides a method, including: obtaining, from a multi-sensor pipe inspection robot that traverses through the interior of a pipe, two or more sets of condition assessment data for the interior of the pipe collected during a single pass through the interior of the pipe; the two or more sets of condition assessment data comprising a first data type obtained using a first sensor type and a second data type obtained using a second sensor type; combining, using a processor, two or more image processing techniques to adjust imaging of a pipe feature; and forming, using the processor, an image of the interior of the pipe using the two or more image processing techniques. Other embodiments are described and claimed.

20 Claims, 5 Drawing Sheets

(56) References Cited

U.S. PATENT DOCUMENTS

2011/0196534 A1\* 8/2011 Ekes ...................... F16L 55/48
 901/44

\* cited by examiner

IMAGE PROCESSING TECHNIQUES FOR MULTI-SENSOR INSPECTION OF PIPE INTERIORS

CROSS-REFERENCE TO RELATED APPLICATIONS

This application is a continuation of U.S. patent application Ser. No. 16/353,034, filed 14 Mar. 2019, which claims priority to U.S. provisional patent application Ser. No. 62/643,482, filed on 15 Mar. 2018, each application being entitled "IMAGE PROCESSING TECHNIQUES FOR MULTI-SENSOR INSPECTION OF PIPE INTERIORS", the contents of each prior application are incorporated by reference herein.

BACKGROUND

Municipal water and sewer pipes are important infrastructure assets for cities and municipalities. These assets need to be inspected in order to plan and implement repair, maintenance, and replacement.

A great deal of pipe data is captured in still images or video, e.g., using cameras to record information from the visible spectrum of light. However, other data can provide additional information beyond what is visible to the naked eye. For example, acoustic, ultraviolet (UV), laser, and infrared (IR) imaging have been utilized to identify details related to pipe topology or condition. In this respect, multi-sensor inspection (MSI) techniques have gained increased attention since more than one sensor type can be employed during the inspection by using a multi-sensor pipe inspection robot. Thus, MSI pipe inspection data often provides a greater understanding of the condition of the interior of a pipe because more than one condition assessment data type is available for review.

BRIEF SUMMARY

In summary, one embodiment provides a method, comprising: obtaining, from a multi-sensor pipe inspection robot that traverses through the interior of a pipe, two or more sets of condition assessment data for the interior of the pipe collected during a single pass through the interior of the pipe; the two or more sets of condition assessment data comprising a first data type obtained using a first sensor type and a second data type obtained using a second sensor type; combining, using a processor, two or more image processing techniques to adjust imaging of a pipe feature; and forming, using the processor, an image of the interior of the pipe using the two or more image processing techniques.

Another embodiment provides a pipe inspection system, comprising: a multi-sensor pipe inspection robot that traverses through the interior of a pipe and obtains two or more sets of condition assessment data for the interior of the pipe collected during a single pass through the interior of the pipe; the multi-sensor pipe inspection robot comprising a first sensor type and a second sensor type; the two or more sets of condition assessment data comprising a first data type obtained using the first sensor type and a second data type obtained using the second sensor type; and a processor that: obtains the two or more sets of condition assessment data for the interior of the pipe collected during a single pass through the interior of the pipe; combines two or more image processing techniques to adjust imaging of a pipe feature; and forms an image of the interior of the pipe using the two or more image processing techniques.

A further embodiment provides a computer program product, comprising:

a non-transitory computer readable medium storing processor executable code, the code comprising: code that obtains, from a multi-sensor pipe inspection robot that traverses through the interior of a pipe, two or more sets of condition assessment data for the interior of the pipe collected during a single pass through the interior of the pipe; the two or more sets of condition assessment data comprising a first data type obtained using a first sensor type and a second data type obtained using a second sensor type; code that combines, using a processor, two or more image processing techniques to adjust imaging of a pipe feature; and code that forms, using the processor, an image of the interior of the pipe using the two or more image processing techniques.

The foregoing is a summary and thus may contain simplifications, generalizations, and omissions of detail; consequently, those skilled in the art will appreciate that the summary is illustrative only and is not intended to be in any way limiting.

For a better understanding of the claimed embodiments, reference is made to the following description and the accompanying drawings.

BRIEF DESCRIPTION OF THE SEVERAL VIEWS OF THE DRAWINGS

FIG. 1(A-B) illustrates example multi-sensor inspection (MSI) pipe inspection robots.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims but is merely representative of those embodiments.

Reference throughout this specification to "embodiment (s)" (or the like) means that a feature, structure, or characteristic described in connection with the embodiment is included in at least one embodiment, which may or may not be claimed. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, etc. In other instances, well-known structures, materials, or operations are not shown or described in detail to avoid obfuscation.

Multi-sensor inspection (MSI) data is useful for understanding the condition of a pipe because it gives multiple data sources for viewing the pipe's interior. Further, in some cases, e.g., if ground penetrating radar is used, the environment around the pipe may be examined, adding further context for evaluating the pipe's condition. However, MSI data is difficult to collect, process and present. This is due at least in part to the imprecise nature of the data collection sensors.

By way of example, each sensor type, e.g., a Light Detection and Ranging (LIDAR) sensor, has a signal to noise ratio. In some cases, the noise in the sensor data can be significant, particularly when attempting to image certain features, e.g., cracks in a pipe wall, erosion in the pipe wall, etc. By way of specific example, a given LIDAR sensor may have about 25 mm of error in its reported data. That is, a LIDAR data point obtained for a location of the interior of the pipe wall may be as much as 25 mm off from the actual location of that point, in terms of distance from the LIDAR sensor. As may be appreciated, this can be a significant source of error in the data when attempting to image imperfections within the pipe's interior, such as a crack or hole in the pipe wall. This is particularly true in smaller pipes, e.g., about 24 inches in diameter and below. Such error in the sensor data leads to reduced accuracy and therefore imprecision in the images formed from the sensor data, e.g., a laser or sonar scan image of the interior of the pipe.

A typical approach to this technical problem is to repeat the measurement cycle to gain additional sensor data. That is, the pipe inspection robot is sent through the interior of the pipe multiple times of for multiple passes. This increases the amount of data that is available and consequently increases the accuracy of the images of the pipe's interior. As is clear, this approach significantly increases the time, complexity, and cost of the inspection process.

Accordingly, an embodiment facilitates a reduced pass, e.g., a single pass, inspection technique for forming images of the pipe's interior with suitable accuracy. In an embodiment, the imaging processing is improved by adjusting the image processing technique applied to the sensor data collected using an MSI pipe inspection robot. That is, given that more than one type of sensor data is available, one type of sensor data may be used to improve another type of sensor data, without the need to undergo multiple passes through the interior of the pipe.

In an embodiment, a single pass of the pipe inspection robot can be used to form improved images of the interior of the pipe by intelligently selecting the image processing technique applied to the sensor data collected in the single pass. In an embodiment, an image processing technique is selected on a feature-level basis. For example, an embodiment uses one of a plurality of the sensor data types to identify a pipe feature and selects an image processing method applied to another sensor data type based on the pipe feature type. This leverages the fact that different statistical methods are more appropriate for forming images of certain features. The features can be automatically identified within the data based on the scan data. Once a feature of interest is identified, e.g., using structured laser light scan data, a predetermined image processing technique is applied for other scan data, e.g., LIDAR data associated with that area of the pipe's interior. Thus, an image processing technique may be selected based on the feature identification, e.g., manhole cover, crack in the pipe's wall, etc. This results in an improved image being formed with fewer data collection passes.

The description now turns to the figures. The illustrated example embodiments will be best understood by reference to the figures. The following description is intended only by way of example and simply illustrates certain selected example embodiments.

Figure 1A:
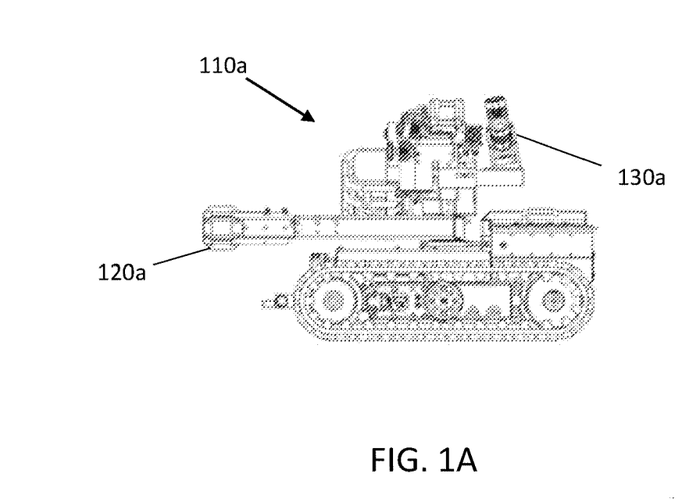

Referring to FIG. 1(A-B), example MSI pipe inspection robots 110a, 110b are illustrated. The example MSI pipe inspection robots 110a, 110b traverse through the interior of a water or sewer pipe, e.g., a 24-inch diameter pipe. As will be readily appreciated, the example MSI pipe inspection robots 110a, 110b may take other forms. In the example illustrated in FIG. 1A, a tracked MSI pipe inspection robot 110a is illustrated. The tracked MSI pipe inspection robot 110a may correspond to a form of MSI inspection robot used by RedZone Robotics, Inc., of Pittsburgh, Pa., USA, under the name RESPONDER. As illustrated, the MSI inspection robot 110a includes a variety of sensor types, two of which are indicated at 120a, 130a. The sensor types may vary, and by way of example sensors 120a, 130a may be selected from the group including three-dimensional 3D LIDAR sensor(s), sonar unit(s), closed-circuit, television (CCTV) with virtual pan, tilt and zoom, gas sensor(s), and temperature sensor(s). Thus, MSI pipe inspection robot 110a may include imaging sensors including at least LIDAR units, sonar units, and visible light cameras.

Figure 1B:
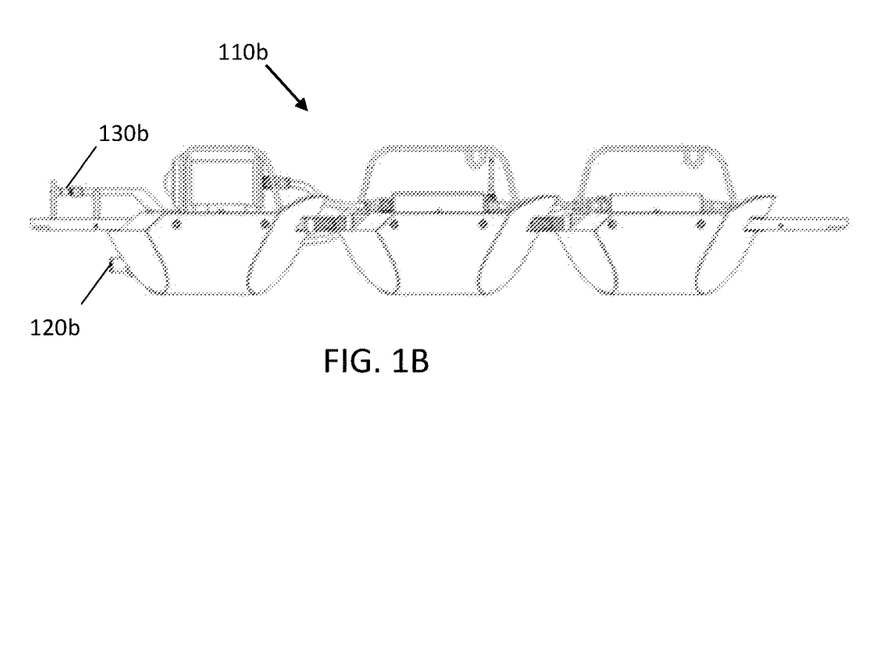

In the example of FIG. 1B, the MSI pipe inspection robot 110b takes the form of a floating raft with multiple units connected together in a train. The MSI pipe inspection robot 110b therefore floats on top of water within the pipe's interior. The raft type MSI pipe inspection robot 110b may correspond to a form of MSI inspection robot used by RedZone Robotics, Inc., of Pittsburgh, Pa., USA, under the name MDPROFILER. As with the MSI pipe inspection robot 110a of FIG. 1A, the MSI pipe inspection robot 110b of FIG. 1B includes a variety of sensors. For example, at least two sensor types 120b, 130b may be included with MSI pipe inspection robot 110b. The sensor types may vary, and by way of example sensors 120b, 130b may be selected from the group including structured laser light sensor(s), sonar unit(s), and closed-circuit television (CCTV) with virtual pan, tilt and zoom. Thus, MSI pipe inspection robot 110b may include imaging sensors including at least sonar unit(s), and structured laser light sensor(s).

Figure 2:
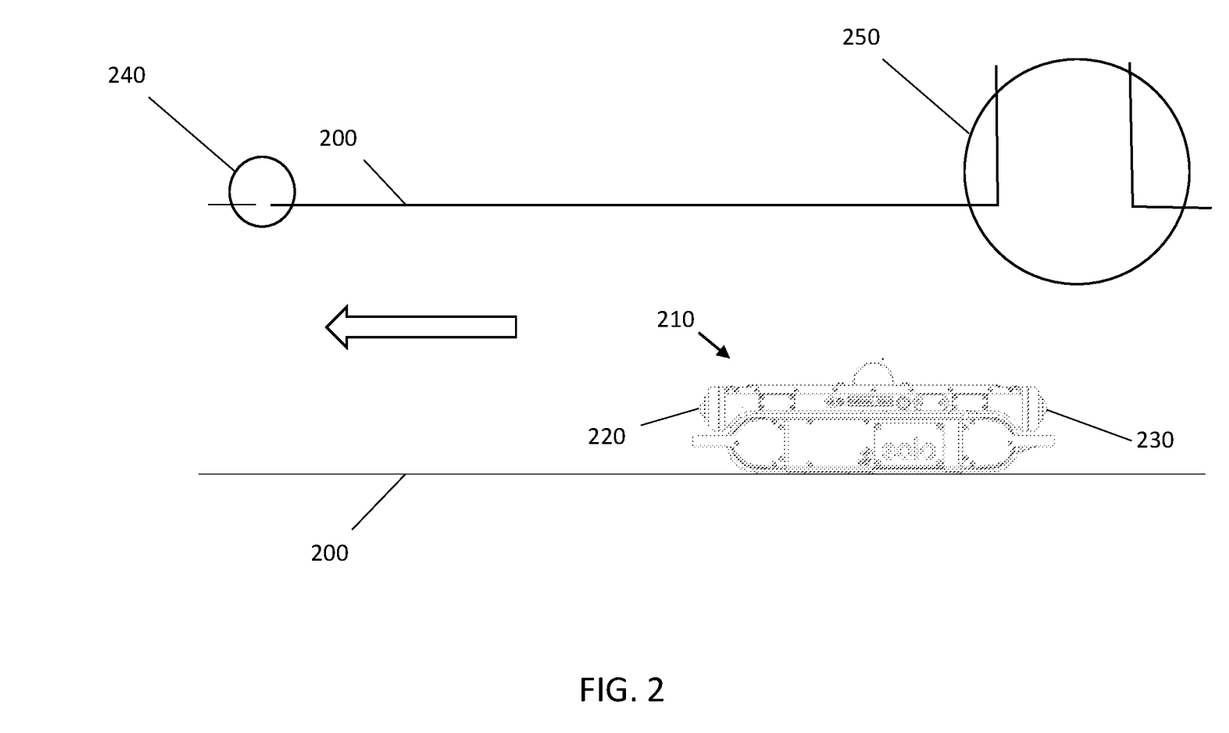
FIG. 2 illustrates an example MSI pipe inspection robot traversing through the interior of a pipe.

Referring to FIG. 2, an MSI pipe inspection robot 210, which includes multiple sensor types 220, 230, traverses through the interior of a pipe 200, e.g., through a municipal water or sewer pipe in the direction indicated by the hollow arrow within the interior of the pipe 200. One of the sensors, e.g., 220, may be a LIDAR unit, whereas another of the sensor types, e.g., 230, may be a laser sensor.

Each sensor may be a time of flight sensor type. To obtain data points related to the distance between the sensors 220, 230 and the interior wall surface of the pipe 200, a time for a sensor output (e.g., laser light) that travels at a known speed to return to a detector is used, such that an image may be constructed from the distance data. The laser sensor, e.g., 230, may produce a ring of laser measurements, e.g., for the upper ⅔ of the pipe or the entire interior of the pipe, depending on whether the pipe is partially filled with water. The laser sensor 230 may take radial measurements in predetermined angular intervals, e.g., every few degrees in a circle. Similarly, the other sensor type, e.g., sensor 220, may take time of flight measurements (e.g., LIDAR measurements), again in order to measure distance between the sensor 220 and the interior surface of the pipe wall. The sensors 220, 230 may thus operate to calculate distance using time of flight, i.e., time to reflect to a detector, in order to build an image of the interior of the pipe 200.

As described herein, conventionally the MSI pipe inspection robot 210 would be passed through the interior of the pipe 200 multiple times, i.e., for multiple passes. This is done to improve the imaging of the interior of the pipe 200 for each sensor type 220, 230. For example, due to noise included in the data points obtained by the sensors 220, 230, each sensor may need to make more than one pass through the pipe 200 in order to collect enough data of sufficient quality to form an image that is sufficiently precise or accurate. Therefore, multiple rounds of data collection are typically required to form a suitable image of the interior of the pipe for each type of image, e.g., laser scan image, LIDAR based image, or combination image (using multiple data types, e.g., one for the top of the interior of the pipe 200 and one for the bottom of the interior of the pipe 200). This is particularly so in areas where the regular geometry of the interior of the pipe 200 is disturbed, e.g., in the area of a crack or break within the pipe, as indicated at 240, in the area of a manhole opening, as indicated at 250, etc.

Figure 3:
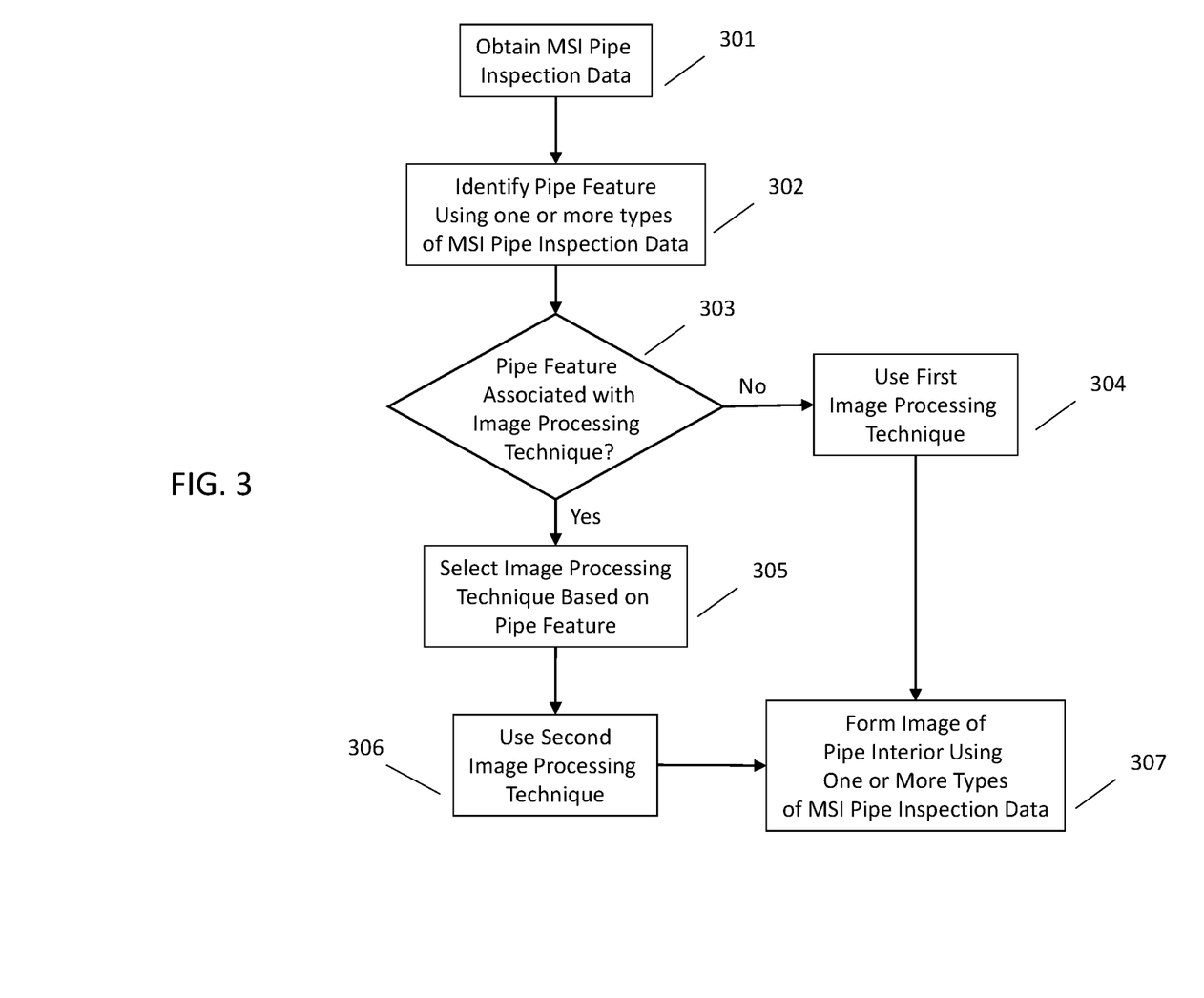
FIG. 3 illustrates an example method of image processing of MSI pipe data.
Figure 4:
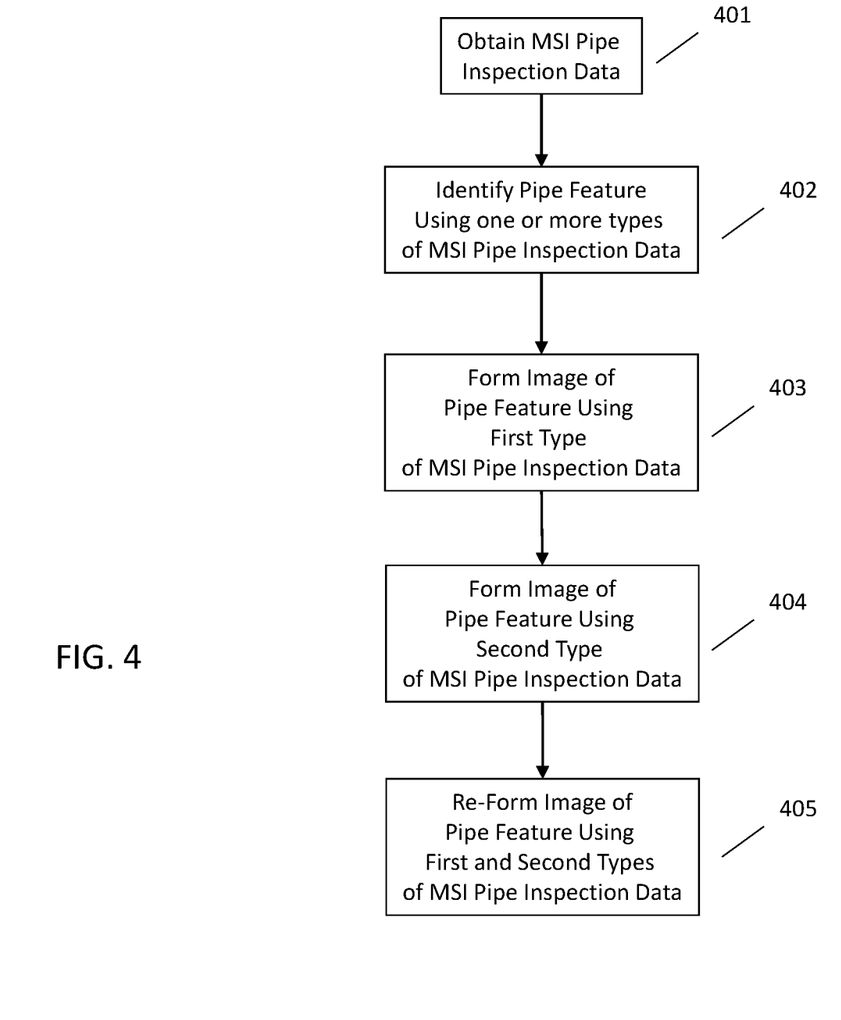
FIG. 4 illustrates an example method of image processing of MSI pipe data.

Accordingly, and referring to FIG. 3 and FIG. 4, an embodiment implements an intelligent image processing technique to improve the image quality using a reduced amount of data collection. By way of example, an embodiment may intelligently leverage multiple data types, collected from multiple sensors, to improve a given sensor's resultant image, without collecting additional data with that particular sensor.

By way of specific example, as illustrated in FIG. 3, an embodiment obtains MSI pipe inspection data at 301. As described herein, this includes collection of pipe inspection data using multiple sensors, which may include sensors of different types, e.g., LIDAR units, sonar units, laser scanners, etc.

One of the sensors reports data that may be used to identify a feature, as indicated at 302. For example, a laser sensor that collects structured laser light data may indicate that a feature of interest is present, e.g., a crack in the wall of the pipe. The identification of the feature may correspond, for example, to a data signature that is identified in real-time or near real-time. The data signature for the feature may be learned. The data signature may be learned in a variety of ways. For example, the data signature may be matched using a statistical analysis, or may be classified using a classification scheme, for example a machine learning algorithm. Alternatively, the feature may be manually detected by reviewing processed data by a human operator.

Once the feature is identified at 302, which may include classification of an image or image feature by matching the image or image feature to a predetermined feature among a predetermined feature set, an embodiment determines if there is an image processing technique associated with the feature, as indicated at 303. The determination made at 303 may be a simple table lookup, e.g., a spline interpolation technique or a nearest neighbor interpolation technique is associated with the given feature, such as a crack, a manhole opening, etc. Alternatively, the determination made at 303 may be more complex, e.g., the determination made at 303 may itself be the result of a classification, for example in the case where two or more candidate features are ranked, and/or where two or more techniques are known to work for a candidate feature and are ranked. In such case, a scoring method may be used to select the feature type and/or the image processing technique. This process may be facilitated by an algorithm that employs machine learning to resolve feature identification and/or resolve the best technique for image processing of a feature type. Alternatively, or in addition, a human operator may provide input that influences or chooses a feature type, assists in feature identification, and/or selects an image processing technique.

If no association between a pipe feature and an image processing technique is made at 303, e.g., an unknown pipe feature is encountered, a regular geometry of the pipe interior is identified, etc., then a first image processing technique may be applied, as indicated at 304. The first image processing technique may be a default or standard image processing technique applied to the data type in question. For example, if regular pipe geometry is detected in low-resolution LIDAR data with +/−25 mm error, and this is confirmed with another data type, e.g., structured laser data measurements of the same area of the interior of the pipe, a first image processing technique may be utilized at 304.

However, if a pipe feature is encountered that is associated with an image processing technique, as determined at 303, then an image processing technique may be selected based on the pipe feature, as indicated at 305, and use of the second image processing technique may be implemented at 306. By way of example, if a sensor data type, e.g., structured laser light data, indicates that a crack is present in the wall of the pipe at a particular location, the corresponding LIDAR data for this location may be obtained, and thereafter subjected to the second image processing technique, as indicated at 306. This facilitates improving the quality of the resultant image that may be formed at 307 using the data type in question, e.g., LIDAR data.

Referring briefly back to FIG. 2, consider the following specific, non-limiting example. While the pipe inspection robot 210 is traversing through the interior of the pipe 200, a crack 240 may be encountered. If the first sensor type 220 is a LIDAR unit, the crack 240 may go undetected or result in a low-resolution image of the crack 240 using a standard image processing technique, e.g., a spline interpolation or other technique that results in a smoothed, curved surface. As such, when viewing the image using a single data pass of LIDAR data, the area of the pipe 200 including the crack 240 may appear as a small depression. However, if the second sensor type 230 is, e.g., a structured laser light sensor, it may have less noise or error when detecting a feature such as crack 240. Therefore, when sensor type 230 passes by the area of the pipe 200 including crack 240, the pipe feature, in this case crack 240, may be detected based on a feature signature in the laser scan data and noted. Such identification or notation may then be used to improve the LIDAR data by changing (which may include initially selecting) the image processing technique applied to the LIDAR data associated with the region of interest, e.g., within a predetermined distance of the crack 240. For example, processing of the LIDAR data using a spline interpolation method may be switched to processing the LIDAR data using a nearest neighbor technique for that area.

Turning to FIG. 4, an embodiment may utilize more than one type of MSI inspection data type to produce an image of a pipe's interior. As illustrated, an embodiment obtains MSI pipe inspection data at 401 and thereafter identifies a pipe feature using the MSI pipe inspection data at 402, e.g., using a feature signature. An image of the pipe feature may be formed using first and second types of MSI pipe inspection data individually, as indicated at 403, 404. That is, a first image and a second image of a pipe feature, e.g., images of a region of the pipe's interior wall inclusive of a feature, may be formed independently with the respective types of MSI pipe inspection data.

An embodiment may improve the images of the pipe feature by using alternative data types. For example, after an image is formed using a first type of pipe inspection data at 403, that image may be re-formed by taking into account the image of the same pipe feature formed at 404 using the second type of MSI data. As an example, a LIDAR image of a pipe feature may be enhanced, e.g., the depth of a crack increased, using a laser scan image of the same pipe crack. This may be accomplished using a variety of techniques, e.g., a change in an interpolation technique utilized, a predetermined modification of pixels within an image based on the pixel values of the other image, a substitution of a region of one image with another, etc. Thus, the resultant re-formed image produced at 405 may be a modified first or second image, or a combination of the first and second images, produced at 403 and 404, respectively.

Figure 5:
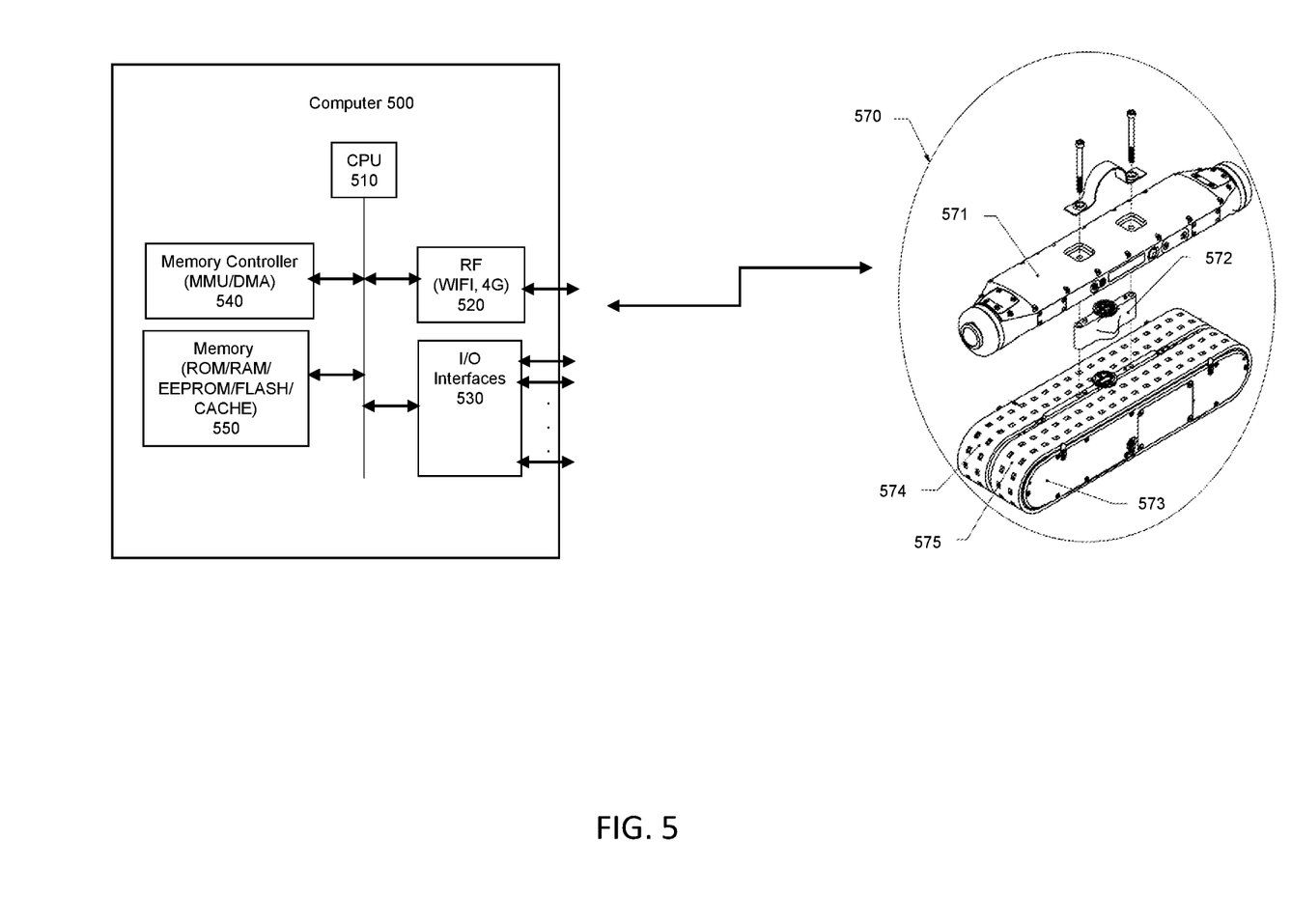
FIG. 5 illustrates an example system.

It will be readily understood that certain embodiments can be implemented using any of a wide variety of devices or combinations of devices. Referring to FIG. 5, an example system-on-chip (SoC) included in a computer 500 is illustrated, which may be used in implementing one or more embodiments. The SoC or similar circuitry outlined in FIG. 5 may be implemented in a variety of devices in addition to the computer 500, for example similar circuitry may be included in a pipe inspection robot 570 (which is an exploded view of the example MSI pipe inspection robot of FIG. 2), or another device or platform. In addition, circuitry other than a SoC may be utilized in one or more embodiments. The SoC of FIG. 5 includes functional blocks, as illustrated, integrated onto a single semiconductor chip to meet specific application requirements.

The central processing unit (CPU) 510, which may include one or more graphics processing units (GPUs) and/or micro-processing units (MPUs), includes an arithmetic logic unit (ALU) that performs arithmetic and logic operations, instruction decoder that decodes instructions and provides information to a timing and control unit, as well as registers for temporary data storage. The CPU 510 may comprise a single integrated circuit comprising several units, the design and arrangement of which vary according to the architecture chosen.

Computer 500 also includes a memory controller 540, e.g., comprising a direct memory access (DMA) controller to transfer data between memory 550 and hardware peripherals. Memory controller 540 includes a memory management unit (MMU) that functions to handle cache control, memory protection, and virtual memory. Computer 500 may include controllers for communication using various communication protocols (e.g., I$^2$C, USB, etc.).

Memory 550 may include a variety of memory types, volatile and nonvolatile, e.g., read only memory (ROM), random access memory (RAM), electrically erasable programmable read only memory (EEPROM), Flash memory, and cache memory. Memory 550 may include embedded programs and downloaded software, e.g., image processing software, pipe inspection mission software, etc. By way of example, and not limitation, memory 550 may also include an operating system, application programs, other program modules, and program data.

A system bus permits communication between various components of the computer 500. I/O interfaces 530 and radio frequency (RF) devices 520, e.g., WIFI and telecommunication radios, are included to permit computer 500 to send and receive data to remote devices using wired or wireless mechanisms. The computer 500 may operate in a networked or distributed environment using logical connections to one or more other remote computers or databases.

The logical connections may include a network, such local area network (LAN) or a wide area network (WAN) but may also include other networks/buses. For example, computer 500 may communicate data with and between a pipe inspection robot 570 and other devices, e.g., a display screen, a heads-up display, VR googles, etc.

The computer 500 may therefore execute program instructions configured to store and analyze MSI pipe inspection data, and perform other functionality of the embodiments, as described herein. A user can interface with (for example, enter commands and information) the computer 500 through input devices, which may be connected to I/O interfaces 530. A display or other type of device may also be connected to the computer 500 via an interface selected from I/O interfaces 530, such as an output interface.

It should be noted that the various functions described herein may be implemented using instructions stored on a memory, e.g., memory 550, that are transmitted to and executed by a processor, e.g., CPU 510. Computer 500 includes one or more storage devices that persistently store programs and other data. A storage device, as used herein, is a non-transitory storage medium. Some additional examples of a non-transitory storage device or medium include, but are not limited to, storage integral to computer 500, such as a hard disk or a solid-state drive, and removable storage, such as an optical disc or a memory stick.

Program code stored in a memory or storage device may be transmitted using any appropriate transmission medium, including but not limited to wireless, wireline, optical fiber cable, RF, or any suitable combination of the foregoing.

Program code for carrying out operations may be written in any combination of one or more programming languages. The program code may execute entirely on a single device, partly on a single device, as a stand-alone software package, partly on a device and partly on another device, or entirely on another device. In an embodiment, program code may be stored in a non-transitory medium and executed by a processor to implement any of the functions or acts specified herein. In some cases, the devices referenced herein may be connected through any type of connection or network, including a local area network (LAN) or a wide area network (WAN), or the connection may be made through other devices (for example, through the Internet using an Internet Service Provider), through wireless connections or through a hard wire connection, such as over a USB connection.

Pipe inspection robot(s) used for obtaining MSI pipe inspection data, as referenced herein, may take a variety of forms and the examples shown in FIG. 1(A-B), FIG. 2 and FIG. 5 are non-limiting examples. The pipe inspection robot 570 of FIG. 5 is an autonomous MSI pipe inspection robot, similar to that illustrated in FIG. 2, shown in an exploded view. The MSI pipe inspection robot 570 includes a tractor module 573 with tracks 574, 575, situated beneath a riser 572 that supports a sensor module 571. Sensor module 571 comprises sensors, e.g., laser, sonar, LIDAR, and/or visual sensors. Other sensor modules may be attached to the riser 572 of the pipe inspection robot 570, in addition to or in lieu of sensor module 571. Other pipe inspection robots may be used, e.g., a raft or floating platform, a larger tracked platform, etc. In an embodiment, a plurality of pipe inspection robots may be used to obtain MSI pipe inspection data of various kinds.

Example embodiments are described herein with reference to the figures, which illustrate example methods, devices and program products according to various example embodiments. It will be understood that the actions and functionality may be implemented at least in part by program instructions. These program instructions (computer code) may be provided to a processor of a device to produce a special purpose machine, such that the instructions, which execute via a processor of the device implement the functions/acts specified.

It is worth noting that while specific elements are used in the figures, and a particular ordering of elements has been illustrated, these are non-limiting examples. In certain contexts, two or more elements may be combined, an element may be split into two or more elements, or certain elements may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   obtaining, from a multi-sensor pipe inspection robot that traverses through the interior of a pipe, two or more sets of condition assessment data for the interior of the pipe collected during a single pass through the interior of the pipe;
   the two or more sets of condition assessment data comprising a first data type obtained using a first sensor type and a second data type obtained using a second sensor type;
   identifying, using a first image processing technique applied to the first data type obtained using the first sensor type, a pipe feature;
   using the pipe feature identified to identify data of the second sensor type associated with the pipe feature;
   selecting, using a processor, a feature specific image processing technique based on the data identified of the second sensor type associated with the pipe feature;
   combining, using a processor, two or more image processing techniques, including the first image processing technique and the feature specific image processing technique, to adjust imaging of a pipe feature; and
   forming, using the processor, an image of the interior of the pipe using the two or more image processing techniques.

2. The method of claim 1, wherein the image of the interior of the pipe is formed using the two or more sets of condition assessment data obtained from the single pass of the pipe inspection robot through the pipe interior.

3. The method of claim 1, wherein the first data type comprises structured laser light data and the second data type comprises Light Detection and Ranging (LIDAR) data.

4. The method of claim 3, wherein the selecting comprises selecting an image processing technique that modifies an interpolation technique used to process one or more of the first data type and the second data type associated with the feature.

5. The method of claim 4, wherein the interpolation technique comprises a statistical technique having a predetermined association with the feature.

6. The method of claim 5, wherein the interpolation technique is one of a nearest neighbor technique and a spline technique.

7. The method of claim 1, wherein the image of the interior of the pipe comprises a three-dimensional image.

8. The method of claim 4, wherein the selected image processing technique modifies a value of a data point of the first data type using a data point value of the second data type.

9. The method of claim 8, wherein a modification is implemented by substituting the value of the data point of the first data type with a newly calculated value.

10. The method of claim 1, comprising transmitting the two or more sets of condition assessment data to a remote device.

11. A pipe inspection system, comprising:
    a multi-sensor pipe inspection robot that traverses through the interior of a pipe and obtains two or more sets of condition assessment data for the interior of the pipe collected during a single pass through the interior of the pipe;
    the multi-sensor pipe inspection robot comprising a first sensor type and a second sensor type;
    the two or more sets of condition assessment data comprising a first data type obtained using the first sensor type and a second data type obtained using the second sensor type; and
    a processor that:
      obtains the two or more sets of condition assessment data for the interior of the pipe collected during a single pass through the interior of the pipe;
      identifies, using a first image processing technique applied to the first data type obtained using the first sensor type, a pipe feature;
      uses the pipe feature identified to identify data of the second sensor type associated with the pipe feature;
      selects a feature specific image processing technique based on the data identified of the second sensor type associated with the pipe feature;
      combines two or more image processing techniques, including the first image processing technique and the feature specific image processing technique, to adjust imaging of a pipe feature; and
      forms an image of the interior of the pipe using the two or more image processing techniques.

12. The pipe inspection system of claim 11, wherein the image of the interior of the pipe is formed using the two or more sets of condition assessment data obtained from the single pass of the pipe inspection robot through the pipe interior.

13. The pipe inspection system of claim 11, wherein the first data type comprises structured laser light data and the second data type comprises Light Detection and Ranging (LIDAR) data.

14. The pipe inspection system of claim 13, wherein the processor selects an image processing technique that modifies an interpolation technique used to process one or more of the first data type and the second data type associated with the feature.

15. The pipe inspection system of claim 14, wherein the interpolation technique comprises a statistical technique having a predetermined association with the feature.

16. The pipe inspection system of claim 15, wherein the interpolation technique is one of a nearest neighbor technique and a spline technique.

17. The pipe inspection system of claim 11, wherein the image of the interior of the pipe comprises a three-dimensional image.

18. The pipe inspection system of claim 14, wherein the selected image processing technique modifies a value of a data point of the first data type using a data point value of the second data type.

19. The pipe inspection system of claim 18, wherein a modification is implemented by substituting the value of the data point of the first data type with a newly calculated value.

20. A computer program product, comprising:
a non-transitory computer readable medium storing processor executable code, the code comprising:
code that obtains, from a multi-sensor pipe inspection robot that traverses through the interior of a pipe, two or more sets of condition assessment data for the interior of the pipe collected during a single pass through the interior of the pipe;
the two or more sets of condition assessment data comprising a first data type obtained using a first sensor type and a second data type obtained using a second sensor type;
code that identifies, using a first image processing technique applied to the first data type obtained using the first sensor type, a pipe feature;
code that uses the pipe feature identified to identify data of the second sensor type associated with the pipe feature;
code that selects a feature specific image processing technique based on the data identified of the second sensor type associated with the pipe feature;
code that combines two or more image processing techniques, including the first image processing technique and the feature specific image processing technique, to adjust imaging of a pipe feature; and
code that forms an image of the interior of the pipe using the two or more image processing techniques.

\* \* \* \* \*